(12) United States Patent
Andersen et al.

(10) Patent No.: US 8,006,811 B2
(45) Date of Patent: Aug. 30, 2011

(54) LOADING DOCK WHEEL RESTRAINT COMPRISING A FLEXIBLE ELONGATE MEMBER

(75) Inventors: Jonathan Andersen, Grafton, WI (US); Timothy Cotton, Milwaukee, WI (US); Kurt Lessard, S Milwaukee, WI (US); Benjamin Wieberdink, Cedar Grove, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 532 days.

(21) Appl. No.: 11/851,945

(22) Filed: Sep. 7, 2007

(65) Prior Publication Data

US 2009/0067964 A1 Mar. 12, 2009

(51) Int. Cl.
*B61H 13/00* (2006.01)

(52) U.S. Cl. ............................................. 188/36; 410/30

(58) Field of Classification Search .................... 188/36, 188/32, 4 R; 410/30, 9–24
See application file for complete search history.

(56) References Cited

U.S. PATENT DOCUMENTS

| 1,102,773 | A | 7/1914 | Martin |
|---|---|---|---|
| 1,418,966 | A | 6/1922 | Perin |
| 1,494,484 | A | 5/1924 | Hudspeth |
| 1,778,852 | A | 11/1928 | Fitch |
| 2,413,744 | A | 1/1947 | Carter |
| 2,773,564 | A | 12/1956 | Garard, Sr. |
| 2,858,905 | A | 11/1958 | Fahland |
| 3,110,466 | A | 11/1963 | O'Sullivan |
| 3,221,907 | A | 12/1965 | O'Sullivan |
| 3,305,049 | A | 2/1967 | Willey |
| 3,447,639 | A | 6/1969 | Parr |
| 3,542,157 | A | 11/1970 | Noah |
| 3,666,118 | A | 5/1972 | Raynes et al. |
| 3,667,160 | A | 6/1972 | Salloum |
| 3,797,410 | A | 3/1974 | Blunden |
| 4,013,145 | A | 3/1977 | Mumm |
| 4,024,820 | A | 5/1977 | Hlinsky et al. |
| 4,122,629 | A | 10/1978 | Rennick |
| 4,146,888 | A | 3/1979 | Grunewald et al. |

(Continued)

FOREIGN PATENT DOCUMENTS

CA 1308222 10/1992

(Continued)

OTHER PUBLICATIONS

International Searching Authority, "International Search Report," issued in connection with counterpart International Patent Application No. PCT/US2008/065904, mailed Aug. 28, 2008, 4 pages.

(Continued)

*Primary Examiner* — Melanie Torres Williams
(74) *Attorney, Agent, or Firm* — Hanley, Flight & Zimmerman, LLC

(57) ABSTRACT

A wheel restraint for restraining a vehicle at a loading dock includes a flexible elongate member with one end that can be manually wrapped at least partially around at least one of the vehicle's wheels. The other end of the elongate member is connected to an anchor that is generally fixed relative to the dock. The anchor preferably includes a reel for taking up slack in the elongate member. When the restraint is not in use, the reel can take up and store the elongate member. The restraint preferably provides a signal that indicates whether the wheel is actually restrained. The restraint might also include a wheel chock coupled to the elongate member. A floor-mounted guide can help prevent interference between the elongate member and certain parts of the vehicle.

25 Claims, 5 Drawing Sheets

U.S. PATENT DOCUMENTS

| | | | |
|---|---|---|---|
| 4,191,503 A | 3/1980 | Neff et al. |
| 4,207,019 A | 6/1980 | Cone |
| 4,208,161 A | 6/1980 | Hipp et al. |
| 4,216,724 A | 8/1980 | Grillet |
| 4,264,259 A | 4/1981 | Hipp |
| 4,267,748 A | 5/1981 | Grunewald et al. |
| 4,282,621 A | 8/1981 | Anthony et al. |
| 4,321,000 A | 3/1982 | Novak |
| 4,373,847 A | 2/1983 | Hipp et al. |
| 4,379,354 A | 4/1983 | Hahn et al. |
| 4,443,150 A | 4/1984 | Hahn et al. |
| 4,472,099 A | 9/1984 | Hahn et al. |
| 4,479,746 A | 10/1984 | Huber |
| 4,553,895 A | 11/1985 | Ellis |
| 4,560,315 A | 12/1985 | Hahn |
| 4,572,080 A | 2/1986 | Williams et al. |
| 4,605,353 A | 8/1986 | Hahn et al. |
| 4,611,961 A | 9/1986 | Van Iperen et al. |
| 4,634,334 A | 1/1987 | Hahn et al. |
| 4,648,764 A | 3/1987 | Pavlick |
| 4,653,967 A | 3/1987 | Isaksson et al. |
| 4,674,929 A | 6/1987 | Blunden |
| 4,674,941 A | 6/1987 | Hageman |
| 4,676,344 A | 6/1987 | Locicero |
| 4,679,974 A | 7/1987 | Blunden |
| 4,695,216 A | 9/1987 | Erlandsson |
| 4,728,242 A | 3/1988 | Erlandsson |
| 4,735,542 A | 4/1988 | Fisher et al. |
| 4,759,678 A | 7/1988 | Hageman |
| 4,765,792 A | 8/1988 | Cherry et al. |
| 4,767,254 A | 8/1988 | Kovach et al. |
| 4,784,567 A | 11/1988 | Hageman et al. |
| 4,786,223 A | 11/1988 | Crissy et al. |
| 4,815,918 A | 3/1989 | Bennett et al. |
| 4,830,563 A | 5/1989 | Yeakle |
| RE32,968 E | 6/1989 | Hahn |
| 4,854,790 A | 8/1989 | Andre |
| 4,861,217 A | 8/1989 | Erlandsson |
| 4,865,508 A | 9/1989 | Carlson |
| RE33,154 E | 1/1990 | Hahn et al. |
| 4,915,568 A | 4/1990 | West |
| RE33,242 E | 6/1990 | Hipp et al. |
| 4,938,647 A | 7/1990 | Erlandsson |
| 4,960,353 A | 10/1990 | Thorndyke |
| 4,963,068 A | 10/1990 | Gelder |
| 4,969,792 A | 11/1990 | Ellis et al. |
| 4,973,213 A | 11/1990 | Erlandsson |
| 4,979,856 A | 12/1990 | Blunden et al. |
| 4,993,898 A | 2/1991 | Klahold |
| 5,037,255 A | 8/1991 | Bullock et al. |
| 5,054,987 A | 10/1991 | Thornton |
| 5,096,021 A | 3/1992 | Tart |
| 5,212,846 A | 5/1993 | Hahn |
| 5,249,905 A | 10/1993 | Warner et al. |
| 5,297,921 A | 3/1994 | Springer et al. |
| 5,302,063 A | 4/1994 | Winsor |
| 5,330,148 A | 7/1994 | Floyd |
| 5,338,136 A | 8/1994 | Hetchler |
| 5,375,965 A | 12/1994 | Springer et al. |
| 5,388,947 A | 2/1995 | Ancel |
| 5,464,076 A | 11/1995 | Benedetto, Jr. |
| 5,490,749 A | 2/1996 | Arbues |
| 5,494,387 A | 2/1996 | Ruegg |
| 5,505,575 A | 4/1996 | Alexander |
| 5,531,557 A | 7/1996 | Springer |
| 5,542,798 A | 8/1996 | Rawdon et al. |
| 5,547,045 A | 8/1996 | Stutzman |
| 5,553,987 A | 9/1996 | Ellis |
| 5,582,498 A | 12/1996 | Springer et al. |
| 5,655,631 A | 8/1997 | Richardson |
| 5,658,106 A | 8/1997 | Dickerson, Sr. |
| 5,685,397 A | 11/1997 | Maddox et al. |
| 5,689,981 A | 11/1997 | DeLuca et al. |
| 5,692,402 A | 12/1997 | Clements |
| 5,709,518 A | 1/1998 | Alexander et al. |
| 5,711,110 A | 1/1998 | Williams |
| 5,743,697 A | 4/1998 | Alexander |
| 5,762,459 A | 6/1998 | Springer et al. |
| 5,839,864 A | 11/1998 | Reynard |
| 5,896,957 A | 4/1999 | Berends et al. |
| 5,908,274 A | 6/1999 | Silberman |
| 5,934,857 A | 8/1999 | Alexander |
| 5,941,666 A | 8/1999 | Waters |
| 5,961,263 A | 10/1999 | Nunez |
| 6,017,173 A | 1/2000 | Anthony et al. |
| 6,082,952 A | 7/2000 | Alexander |
| 6,092,970 A | 7/2000 | Hahn et al. |
| 6,113,337 A | 9/2000 | Massey |
| 6,123,496 A | 9/2000 | Alexander |
| 6,199,668 B1 | 3/2001 | Gorza et al. |
| 6,238,163 B1 | 5/2001 | Springer et al. |
| 6,250,432 B1 | 6/2001 | Hageman et al. |
| 6,276,496 B1 | 8/2001 | Hageman et al. |
| 6,318,947 B1 | 11/2001 | Hahn et al. |
| RE37,570 E | 3/2002 | Springer et al. |
| 6,357,987 B1 | 3/2002 | Palus |
| 6,371,253 B1 | 4/2002 | Berends et al. |
| 6,505,713 B1 | 1/2003 | Paul et al. |
| 2005/0133315 A1 | 6/2005 | Hoofard |
| 2005/0226705 A1 | 10/2005 | Wilson |
| 2006/0051196 A1 | 3/2006 | McDonald |

FOREIGN PATENT DOCUMENTS

| | | |
|---|---|---|
| CA | 2164737 | 6/1997 |
| CA | 2164738 | 6/1997 |
| DE | 583404 | 9/1933 |
| DE | 2735826 | 2/1979 |
| DE | 205852 | 1/1984 |
| DE | 3830891 | 3/1990 |
| DE | 4120035 | 12/1992 |
| DE | 4119480 | 1/1993 |
| DE | 4242415 | 2/1994 |
| DE | 4401653 | 10/1995 |
| DE | 4427406 | 10/1995 |
| EP | 0284532 | 9/1988 |
| EP | 0302356 | 2/1989 |
| EP | 0366571 | 5/1990 |
| EP | 0384850 | 8/1990 |
| EP | 0442245 | 8/1991 |
| EP | 0537075 | 4/1993 |
| EP | 0580415 | 1/1994 |
| EP | 0639488 | 2/1995 |
| EP | 0706912 | 4/1996 |
| EP | 0775653 | 5/1997 |
| EP | 1095880 | 2/2001 |
| EP | 1120371 | 8/2001 |
| FR | 1469877 | 2/1967 |
| FR | 2284481 | 4/1976 |
| FR | 2394423 | 1/1979 |
| FR | 2652340 | 9/1989 |
| FR | 2672578 | 8/1992 |
| FR | 2689845 | 10/1993 |
| FR | 2736336 | 1/1997 |
| IT | 526008 | 5/1955 |
| JP | 60036230 | 2/1985 |
| NL | 157253 | 6/1968 |
| SU | 1036593 | 8/1983 |
| WO | 79/00576 | 8/1979 |
| WO | 93/01952 | 2/1993 |
| WO | 95/18029 | 7/1995 |
| WO | 96/12665 | 5/1996 |
| WO | 97/02201 | 1/1997 |
| WO | 97/44220 | 11/1997 |
| WO | 97/49627 | 12/1997 |

OTHER PUBLICATIONS

International Searching Authority, "Written Opinion of the International Searching Authority," issued in connection with counterpart International Patent Application No. PCT/US2008/065904, mailed Aug. 28, 2008, 7 pages.

Photographs of Combar Wheel-Restraint Product, taken in Nov. 1991 (2 pages).

Dyna Seal B.V., Brochure of Load and Unload Safely with the Dyna Seal Wheelblocker, Jan. 1993 (8 pages—with 4 pages of the original brochure in Dutch language and 4 pages of the English language translation).

Photographs of Kelley Auto-Chock Installation at Ford Detroit Parts Facility, taken in Jun. 1991 (2 pages).

Kelley, Brochure of Kelley Auto Chock Truck Restraint, Jan. 1991 (2 pages).

Pentalift, Inc., Drawings of Proposed Penta-Chock Installation for Coca-Cola, Mar. 6, 1991 (2 pages).

Super Seal MFG. LTD., Super Seal Dock Seals Catalog 11160/SU, received by the United States Patent and Trademark Office on Aug. 29, 1989 (8 pages).

Photograph of Wheel Restraint installed at Unilever near Moscow, Russia, Installation observed and Photograph taken on Mar. 1, 2007 (1 page).

International Bureau, "International Preliminary Report on Patentability," issued in connection with corresponding international application serial No. PCT/US2008/065904, issued Mar. 9, 2010, 8 pages.

LOADING DOCK WHEEL RESTRAINT COMPRISING A FLEXIBLE ELONGATE MEMBER

FIELD OF THE DISCLOSURE

The subject disclosure generally pertains to restraining a vehicle at a loading dock and more specifically to a wheel restraint.

BACKGROUND OF RELATED ART

When a truck, trailer or some other vehicle is parked at a loading dock, often some sort of vehicle restraint is used to keep the truck from inadvertently moving away from an elevated platform of the dock. This allows a forklift truck to safely drive between the dock platform and the truck for the purpose of loading or unloading the cargo inside the truck.

There are a variety of vehicle restraints available that can be installed at a loading dock for engaging the truck's RIG (Rear Impact Guard), also known as an ICC bar. An ICC bar is a beam that extends horizontally across the rear of a truck, just below the truck bed. Its primary purpose is to prevent an automobile from under-riding the truck in a rear-end collision. However, not all trucks have an ICC bar that can be readily engaged by an ICC-style restraint, so in those cases a wheel restraint can be used for blocking one or more of the truck's wheels.

Perhaps the most common wheel restraint is simply a wheel chock that wedges between the driveway and the underside of the wheel. However, wheel chocks often slip out of position on driveways that are slippery due to oil, rain, ice, sand, gravel or dirt. Sometimes, wheel chocks wedge so tightly under the wheel that they become very difficult to remove. Trucks have also been known to drive completely up and over a wheel chock. Wheel chocks are often loose items that are not permanently attached to the loading dock area, so they tend to get misplaced.

One solution to the problems associated with manually installed wheel chocks can be found in U.S. Pat. Nos. 5,553, 987 and 5,582,498. These patents disclose powered wheel restraints that travel along a track. However, such wheel restraints cannot always be readily installed at loading docks that may already have a drain or some other driveway irregularity situated where the track is to be installed.

A wheel restraint disclosed in U.S. Pat. No. 3,305,049 has a wheel chock that travels along a lead screw that is elevated above a driveway. However, there are some significant problems with the device. The chock always moves between its upright retracted position and its horizontally extended position at the same place along the lead screw, i.e., where the chock slides along the curved bar 26. If part of the truck/trailer happens to be at this location, that part could obstruct the movement of the chock. For example, such a part could include another wheel of the truck or trailer. And the location of the wheels is unpredictable due to the wide variety of trucks and trailers. Moreover, tools and other equipment are often stowed under the trailer, which could also obstruct the movement of the chock. The likelihood of hitting the stowed parts is increased, as the chock swings downward form a high, upright position. The higher up the chock reaches, the more likely it will reach the stowed parts. Damage may occur to the obstructing part or the wheel restraint itself if the lead screw continues to drive the chock regardless of any obstruction. Further, once the chock extends laterally outward, the lead screw drags the chock along the driveway until it reaches the first wheel. The dragging motion could plow quite an accumulation of snow and dirt up against the tire. Overtime, the dragging motion could eventually erode the surface of the driveway.

Another powered wheel chock system is disclosed in U.S. Pat. No. 5,709,518. The '518 device includes a sensor bar that swings a chock plate about a vertical axis at pivot hole. However, the device's ability to accommodate wheels of various diameters appears to be quite limited, as the distance between bar and chock plate is fixed. Increasing the distance between the bar and chock plate to match larger diameter wheels could create an interference problem between the chock plate and a forward set of wheels of a tandem axle trailer. The interference problem is worsened by the way the chock plate is first extended between the wheels and subsequently moved back against a front portion of the rear wheel. The additional backward movement requires additional space between a set of tandem wheels. The greatest space is at the lowest portion of the wheel; however, engaging a wheel at such a low point leads to other problems. If the chock plate, for instance, is too low, a truck may simply drive over it, especially if the truck/trailer is light (e.g., unloaded).

In addition to the specific problems of various powered wheel restraints, such wheel restraints in general are quite elaborate and expensive mechanisms. Thus, there is still a need for a simple yet effective way of restraining the wheel of a truck at a loading dock.

SUMMARY

In some embodiments, a vehicle is restrained at a loading dock by using a flexible elongate member to restrain one or more of the vehicle's wheels.

In some embodiments, a retractable strap wraps at least partially around a vehicle's wheel to retrain the vehicle at a loading dock.

In some embodiments, a wedge such as a wheel chock is snugly tethered to an anchor at loading dock to ensure that the chock holds its position relative to a chocked wheel.

In some embodiments, a wheel restraint includes a flexible elongate member that can retract for storage.

In some embodiments, the engagement of a barrier to a wheel is determined and signaled by sensing some feature associated with a restraint that includes a flexible elongate member.

In some embodiments, a vehicle's wheel is restrained by the combination of a wheel chock and a flexible elongate member.

In some embodiments, a wheel restraint includes a floor-mounted guide that avoids interference between a flexible elongate member and parts of a vehicle.

DETAILED DESCRIPTION

Figure 1:
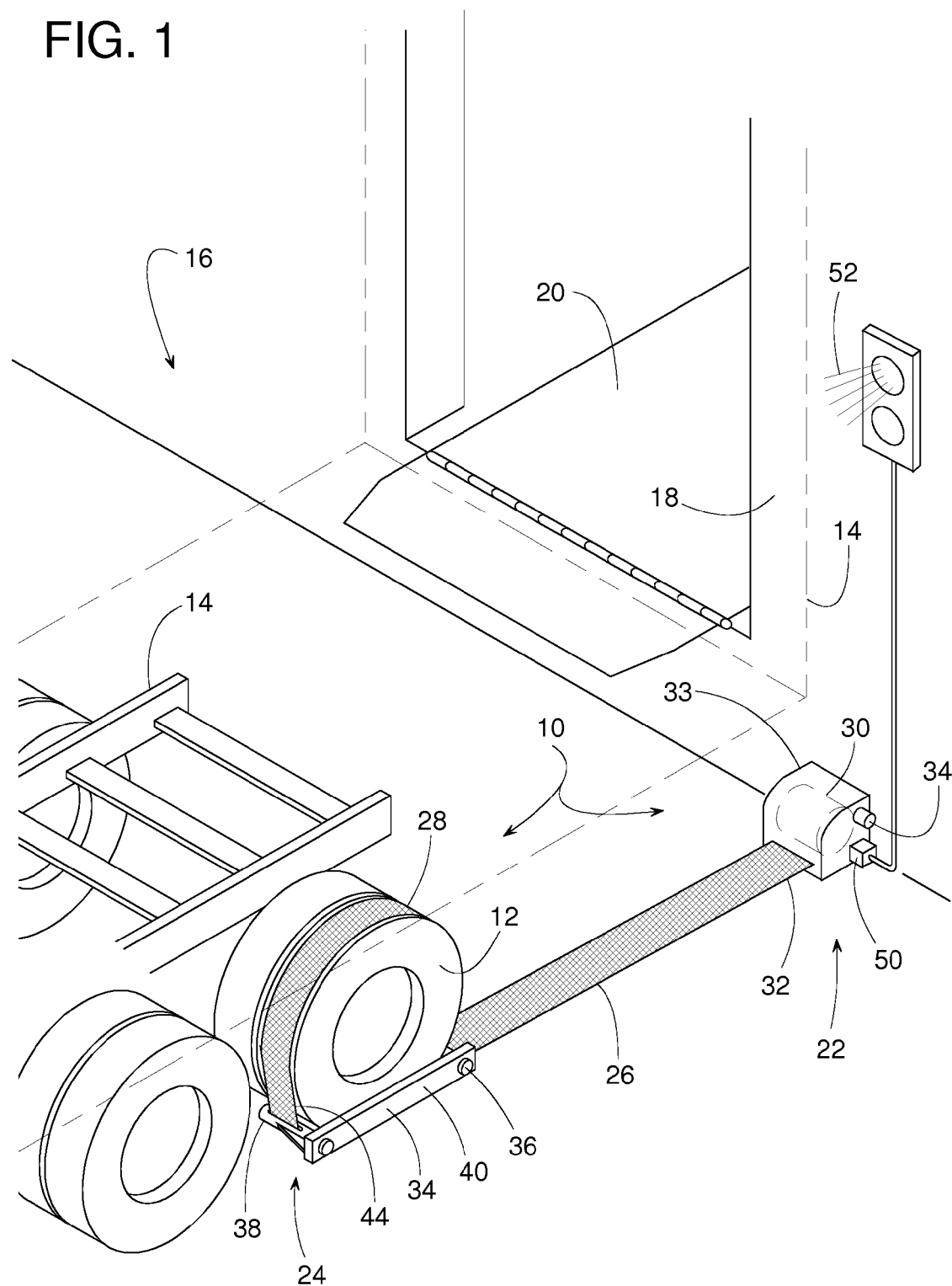
FIG. 1 is a perspective view a wheel restraint in a holding position.
Figure 2:
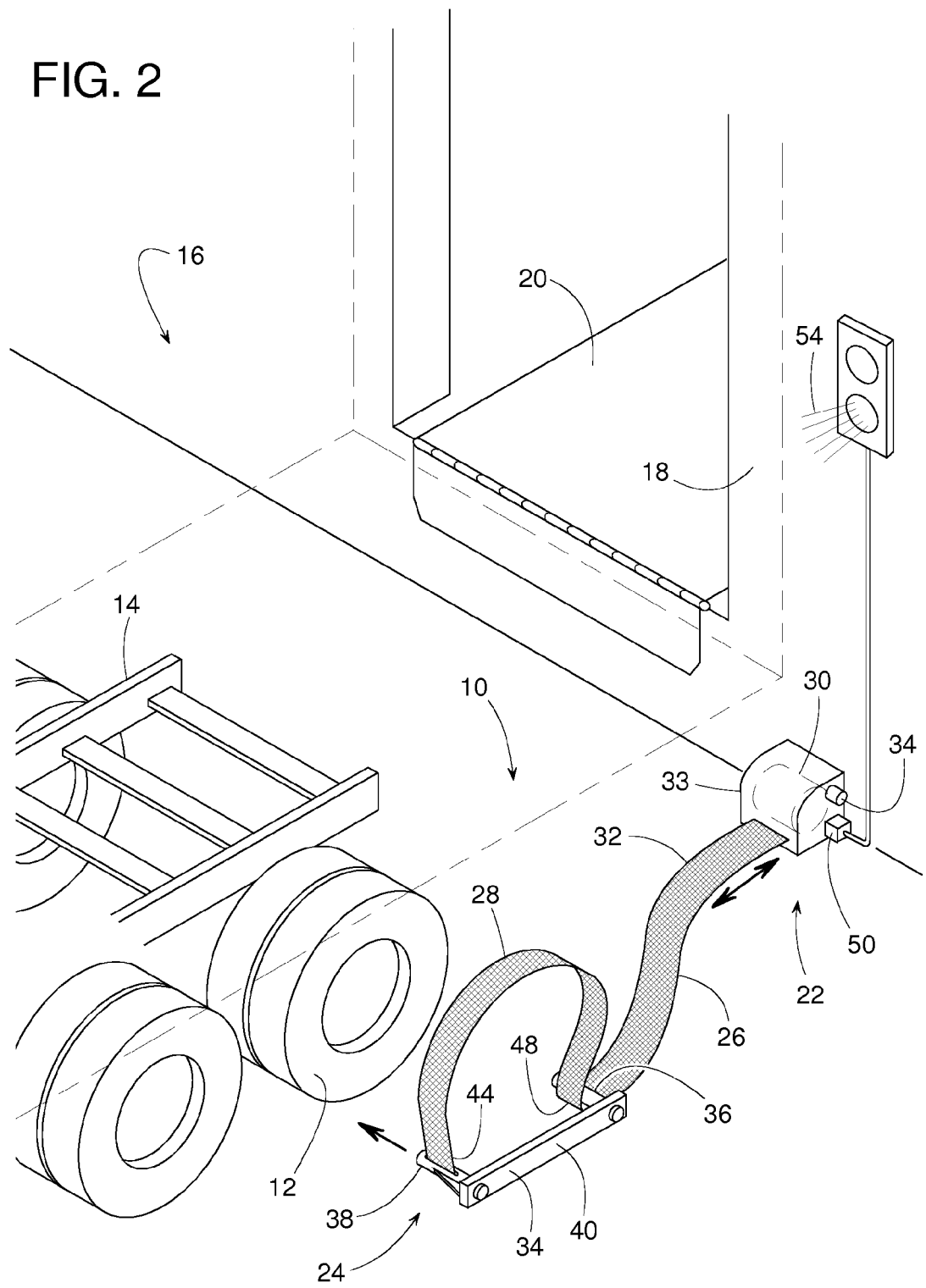
FIG. 2 is a perspective view of the wheel restraint of FIG. 1 but showing the restraint in a release position.

FIGS. 1 and 2 show a wheel restraint 10 for restraining at least one wheel 12 of a vehicle 14 at a loading dock 16.

Restraint 10 is shown in a holding position in FIG. 1 and is shown in a release position in FIG. 2. In the holding position, restraint 10 helps hold vehicle 14 adjacent to a dock face 18 so that cargo can be safely conveyed on and off of vehicle 14. In some cases, a conventional dock leveler 20 can be used to facilitate the loading and unloading operations. An upper section of vehicle 14 is shown in phantom lines to more clearly show restraint 10 in the holding position.

Restraint 10 basically comprises an anchor 22 that can be installed at a generally fixed location, a barrier 24 that can be manually positioned to selectively engage or release wheel 12, and a flexible elongate member 26 that couples barrier 24 to anchor 22. Although the actual structure of restraint 10 may vary, in some embodiments, elongate member 26 is a nylon strap with a distal section 28 that can be wrapped at least partially around wheel 12, as shown in FIG. 1. Other examples of elongate member 26 include, but are not limited to, a strap made of another material, a cable, cord, chain, rope, etc.

In this particular example, anchor 22 includes a take-up reel 30 upon which a proximal section 32 of member 26 can be wrapped and stored. Reel 30 can be manually operated by a hand crank, power operated by a motor, or operated in a manner similar to that of a conventional seatbelt (i.e., spring loaded to retract elongate member 26 plus a ratchet that locks member 26 in place). To allow member 26 to be manually pulled out from within a housing 33 of anchor 22, a suitable release actuator 34 (e.g., button, lever, solenoid, switch, etc.) can be used for unlocking reel 30.

Figure 3:
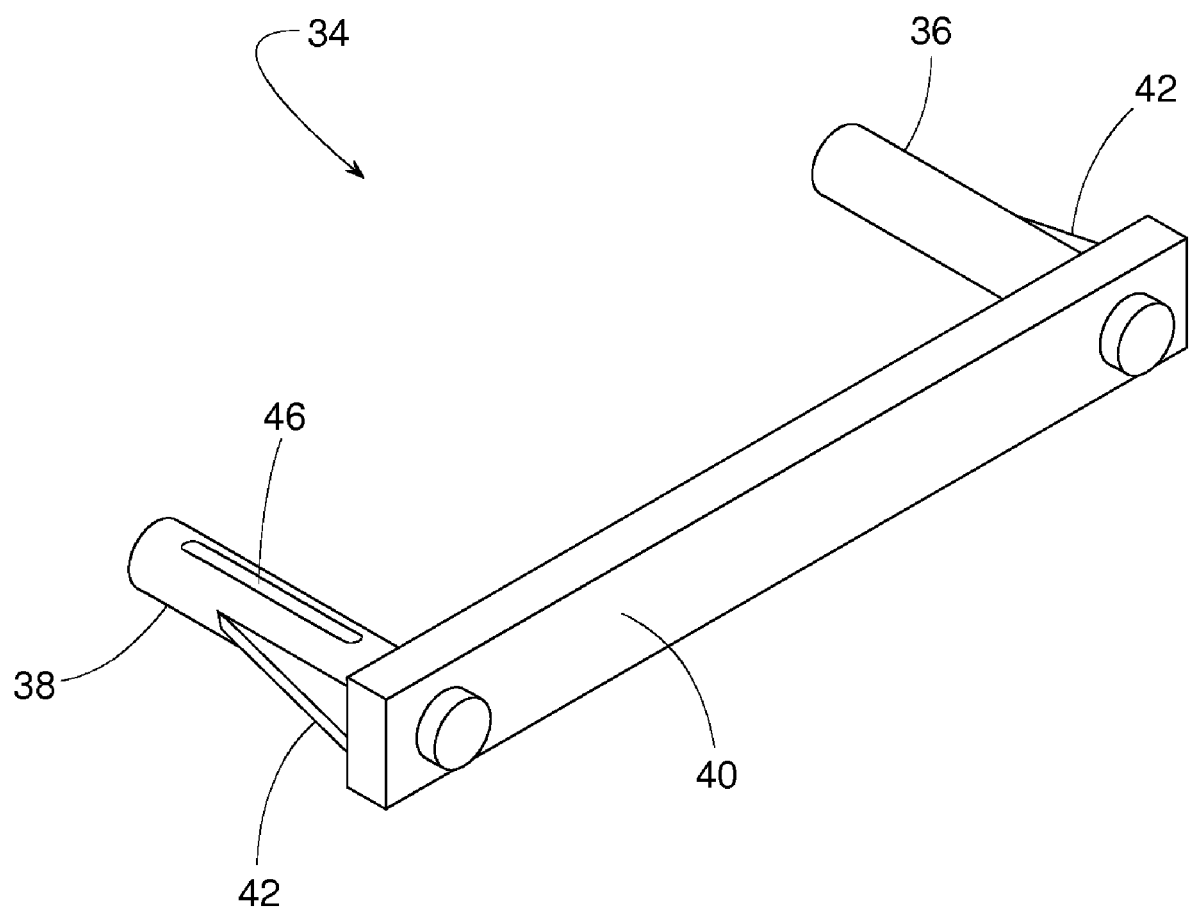
FIG. 3 is a perspective view of a part used in the restraint of FIGS. 1 and 2.

To help hold restraint 10 to wheel 12, barrier 24 could comprise the strap's distal section 28 plus a bracket 34. FIG. 3 shows bracket 34 comprising a forward bar 36 and a rear bar 38 extending from a main bar 40. Gussets 42 can be added to reinforce the connection of bars 36 and 38 to main bar 40. An end 44 of section 28 can be attached to rear bar 38 in some suitable manner such as via slot 46 of rear bar 38 or by wrapping end 44 completely around bar 38. An intermediate section 48 of member 26 can extend underneath forward bar 36. In this manner, proximal section 32 of member 26 is held close to the ground, while distal section 28 effectively captures wheel 12, thereby inhibiting vehicle 14 from accidentally pulling away from dock face 18.

Wheel restraint 10 might also include a switch 50 that provides a visual and/or audible signal that indicates whether wheel 12 is restrained by barrier 24. In some cases, for instance, a red light signal 52 indicates that wheel 12 is restrained, and a green light signal 54 indicates that vehicle 14 is free to depart. Switch 50 could be operatively coupled to elongate member 26 or take-up reel 30 and provide the visual or audible signal in response to switch 50 either sensing tension in member 26 or detecting that member 26 is extended at least a certain distance from anchor 22. Countless other ways of determining and signaling whether wheel 12 is actually restrained are also well within the scope of the invention.

Figure 4:
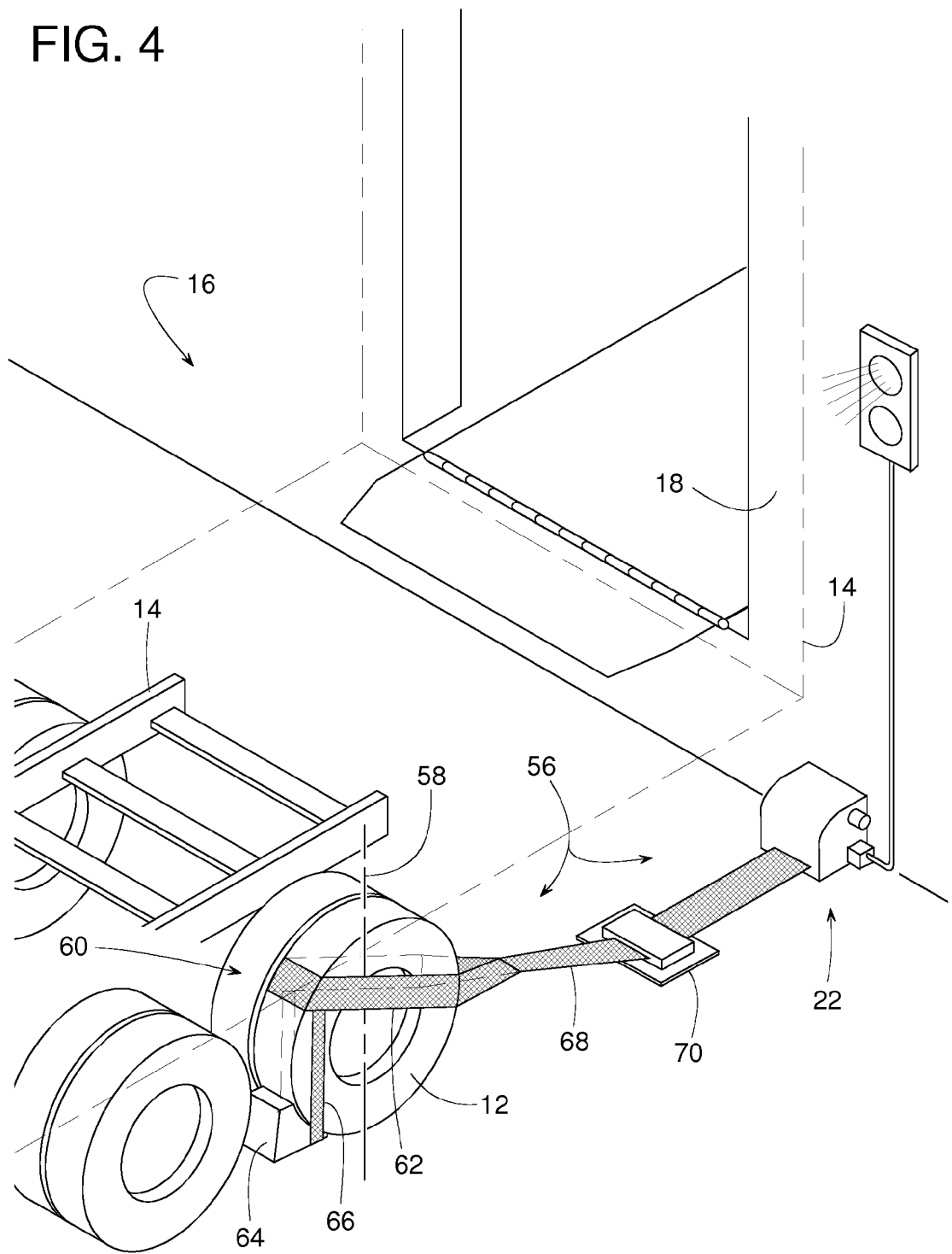
FIG. 4 is a perspective view of another wheel restraint in a holding position.
Figure 5:
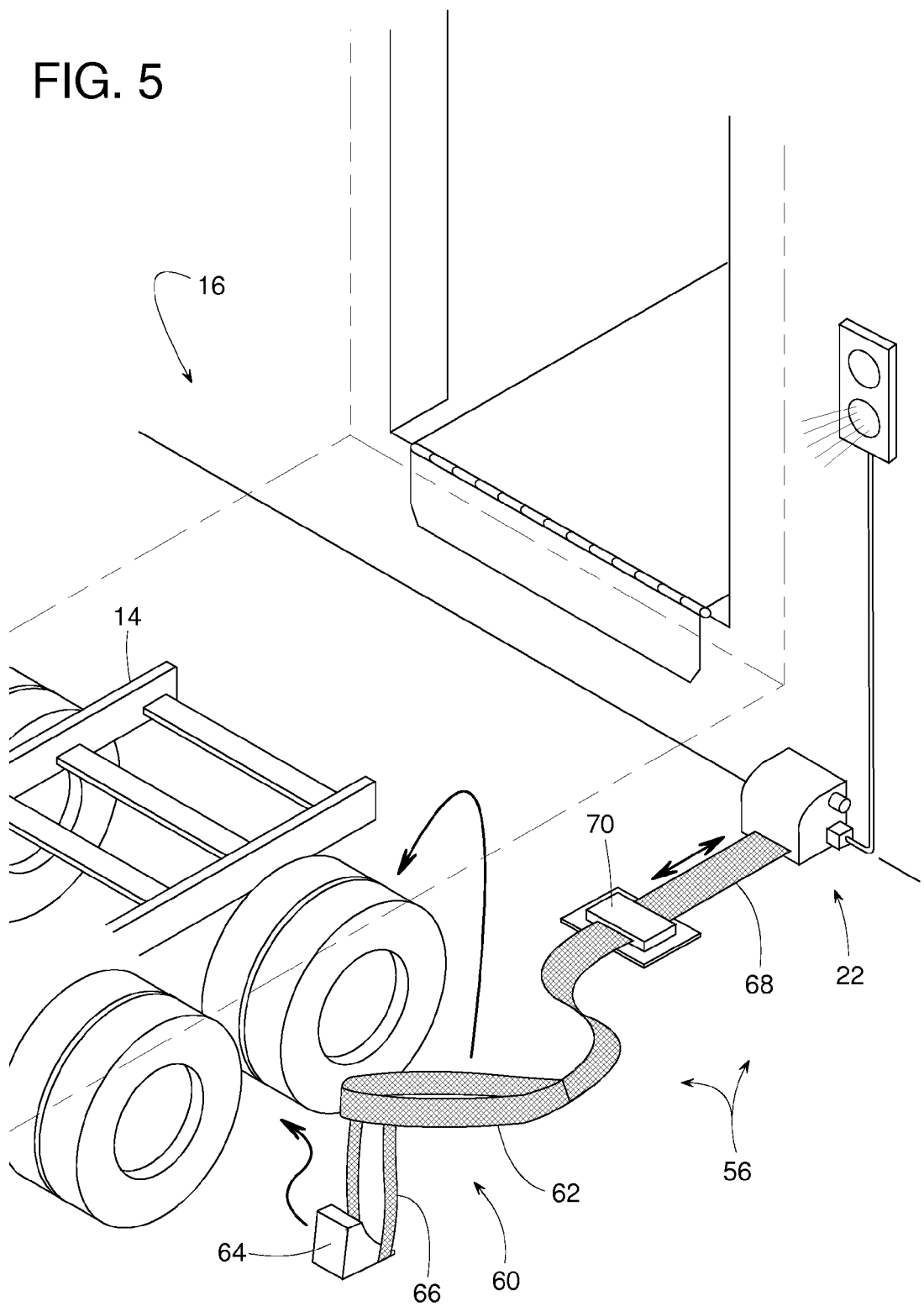
FIG. 5 is a perspective view of the wheel restraint of FIG. 4 but showing the restraint in a release position.

In an alternate embodiment, shown in FIGS. 4 and 5, a wheel restraint 56 restrains vehicle 14 upon encircling at least one wheel 12 is such a way as to also encircle an imaginary vertical line 58 that intersects the wheel 12. FIG. 4 shows wheel restraint 56 in a holding position, and FIG. 5 shows restraint 56 in a release position.

To capture wheel 12, as shown in FIG. 4, restraint 56 includes a barrier 60 comprising a loop 62 and a wedge 64. A coupling 66 connects loop 62 to wedge 64 to prevent wheel 12 from forcibly escaping between loop 62 and wedge 66. Coupling 66 can be a pair of rigid or flexible members including, but not limited to, a pair of fabric straps. Loop 62 can be made of a flexible strap or made of some other flexible or rigid material. A flexible elongate member 68 connects barrier 60 to anchor 22. Member 68 can be fed through a floor-mounted guide 70 to avoid interference between member 68 and various low-hanging parts of vehicle 14. Examples of member 68 include, but are not limited to, a nylon strap, a strap made of another material, a cable, cord, chain, rope, etc.

Although the invention is described with respect to various embodiments, modifications thereto will be apparent to those of ordinary skill in the art. The scope of the invention, therefore, is to be determined by reference to the following claims:

The invention claimed is:

1. A wheel restraint that can engage a wheel of a vehicle at a loading dock, wherein the loading dock includes a dock face, the wheel restraint comprising:
    an anchor mountable to the loading dock;
    a barrier manually selectively movable to a release position and a holding position when the vehicle is at the loading dock, wherein the wheel is between the barrier and the dock face when the barrier is in the holding position, and the wheel is clear of the barrier when the barrier is in the release position; and
    a flexible elongate member that couples the barrier to the anchor and is to span a gap between the wheel and the loading dock when the barrier is in the holding position, wherein, when the barrier is in the holding position, the barrier is to encircle the wheel and encircle an imaginary vertical line that intersects the wheel.

2. The wheel restraint of claim 1, wherein the flexible elongate member is retractable between the barrier and the anchor.

3. The wheel restraint of claim 2, wherein the anchor includes a take-up reel connected to the flexible elongate member.

4. The wheel restraint of claim 1, wherein the flexible elongate member is a strap.

5. The wheel restraint of claim 1, further comprising a switch associated with at least one of the anchor, the barrier or the flexible elongate member, wherein the switch provides a signal that indicates whether the wheel is restrained by the barrier.

6. The wheel restraint of claim 1, further comprising a wedge coupled to the flexible elongate member, the wedge engages the wheel when the barrier is in the holding position.

7. A wheel restraint that can engage a wheel of a vehicle at a loading dock, wherein the loading dock includes a dock face, the wheel restraint comprising:
    an anchor to be located at the dock face;
    a barrier manually selectively movable to a release position and a holding position when the vehicle is at the loading dock, wherein the wheel is between the barrier and the dock face when the barrier is in the holding position, and the wheel is clear of the barrier when the barrier is in the release position;
    a flexible elongate member that couples the barrier to the anchor and is to span a distance between the wheel and the loading dock when the barrier is in the holding position; and
    a rear bar coupled to the barrier and the flexible elongate member, wherein the wheel is between the barrier and the rear bar when the barrier is in the holding position.

8. The wheel restraint of claim 1, further comprising a floor-mountable guide through which the flexible elongate member extends.

9. The wheel restraint of claim 1, wherein the barrier is an integral extension of the flexible elongate member.

10. The wheel restraint of claim 7, wherein the barrier in the holding position encircles the wheel and encircles an imaginary vertical line that intersects the wheel.

11. The wheel restraint of claim 7, wherein the flexible elongate member is a strap.

12. The wheel restraint of claim 7, further comprising a floor-mountable guide through which the flexible elongate member extends.

13. The wheel restraint of claim 7, wherein the barrier is an integral extension of the flexible elongate member.

14. The wheel restraint of claim 7, further comprising a rear bar coupled to the barrier and the flexible elongate member, the wheel is between the barrier and the rear bar when the barrier is in the holding position.

15. The wheel restraint of claim 7, wherein the flexible elongate member overlays the wheel when the barrier is in the holding position.

16. A wheel restraint that can engage a wheel of a vehicle at a loading dock, wherein the loading dock includes a dock face, the wheel restraint comprising:
an anchor mountable at the loading dock;
a barrier manually selectively movable to a release position and a holding position when the vehicle is at the loading dock, wherein the wheel is between the barrier and the dock face when the barrier is in the holding position, and the wheel is clear of the barrier when the barrier is in the release position; and
a flexible elongate member that couples the barrier to the anchor, wherein the flexible elongate member is to overlay the wheel when the barrier is in the holding position and to span a separation between the wheel and the loading dock.

17. The wheel restraint of claim 16, further comprising a wedge coupled to the flexible elongate member, the wedge engages the wheel when the barrier is in the holding position.

18. The wheel restraint of claim 16, wherein the barrier in the holding position encircles the wheel and encircles an imaginary vertical line that intersects the wheel.

19. The wheel restraint of claim 16, wherein the flexible elongate member is a strap.

20. The wheel restraint of claim 16, further comprising a floor-mountable guide through which the flexible elongate member extends.

21. The wheel restraint of claim 16, wherein the barrier is an integral extension of the flexible elongate member.

22. The wheel restraint of claim 16, further comprising a rear bar coupled to the barrier and the flexible elongate member, the wheel is between the barrier and the rear bar when the barrier is in the holding position.

23. The wheel restraint of claim 16, wherein the flexible elongate member is retractable between the barrier and the anchor.

24. The wheel restraint of claim 16, wherein the wheel restraint includes a take-up reel connected to the flexible elongate member.

25. The wheel restraint of claim 16, further comprising a switch associated with at least one of the anchor, the barrier or the flexible elongate member, wherein the switch provides a signal that indicates whether the wheel is restrained by the barrier.

* * * * *